(12) United States Patent  (10) Patent No.: US 8,313,360 B2
Murray et al.  (45) Date of Patent: Nov. 20, 2012

(54) RASP BAR AND SUPPORT

(75) Inventors: Craig E. Murray, Davenport, IA (US); Dale R. Tanis, Geneseo, IL (US); David V. Dobbins, Westmont, IL (US); Randall L. Wilson, Galesburg, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/030,493

(22) Filed: Feb. 18, 2011

(65) Prior Publication Data

US 2012/0214560 A1 Aug. 23, 2012

(51) Int. Cl.
*A01F 12/34* (2006.01)
(52) U.S. Cl. .......................................... 460/71
(58) Field of Classification Search ............. 460/66, 460/71, 72, 121, 122; 241/294, 241
See application file for complete search history.

(56) References Cited

U.S. PATENT DOCUMENTS

| | | | |
|---|---|---|---|
| 836,030 A | 11/1906 | Hall | |
| 2,796,868 A | 6/1957 | Oliver | |
| 3,256,887 A * | 6/1966 | Ausherman | 460/71 |
| 3,848,609 A | 11/1974 | Mortier et al. | |
| 3,927,679 A | 12/1975 | Ausherman | |
| 4,936,810 A | 6/1990 | Strong et al. | |
| 4,946,419 A | 8/1990 | Cromheecke et al. | |
| 5,035,675 A | 7/1991 | Dunn et al. | |
| 5,192,245 A | 3/1993 | Francis et al. | |
| 5,254,036 A | 10/1993 | Johnson et al. | |
| 5,309,702 A | 5/1994 | Lundahl et al. | |
| 6,264,553 B1 | 7/2001 | Neumann et al. | |
| 6,325,714 B1 | 12/2001 | Tanis et al. | |
| 6,503,143 B2 | 1/2003 | Gerber et al. | |
| 6,729,952 B2 | 5/2004 | Voss et al. | |
| 7,632,182 B2 | 12/2009 | Farley et al. | |
| 7,749,054 B2 * | 7/2010 | Farley et al. | 460/71 |
| 8,087,982 B1 * | 1/2012 | Kile | 460/71 |
| 2009/0197655 A1 | 8/2009 | Ellingson | |

* cited by examiner

*Primary Examiner* — Alicia Torres
(74) *Attorney, Agent, or Firm* — Michael G. Harms (57) ABSTRACT

A rasp bar assembly is disclosed that includes a rasp bar having a plurality of rotation stops that contact the rasp bar mount. The plurality of rotation stops stabilize the rasp bar upon the rasp bar mount and prevent the rasp bar from rotating from its assembled position.

8 Claims, 8 Drawing Sheets

RASP BAR AND SUPPORT

FIELD OF THE INVENTION

The present invention is directed to rotary threshing systems for agricultural combines and, more particularly, to rasp bar assemblies for mounting on threshing rotors in axial flow-type combines.

BACKGROUND OF THE INVENTION

Many agricultural combines use a rotary threshing and/or separating system. The system typically includes at least one rotor drivingly rotated within a rotor housing or cage including a perforated concave spaced radially outwardly thereof. The rotor will often have a frusto-conical inlet end having a helical flight or flights there around for conveying a flow of crop material into a space between the rotor and the rotor cage. The main body of the rotor will typically have an array or layout of threshing elements, typically rasp bars, which protrude radially outwardly into the space for conveying a mat of the crop material along a helical path through the space. Rasp bars cooperate with the rotor housing to separate larger components of the crop, namely crop residue commonly referred to as straw, which includes stalks, stems, cobs and the like, from the smaller grain and material other than grain.

Rasp bars are typically mounted to a support bracket on the rotor by a bolt. Worn rasp bars may be replaced by removing the bolt and attaching a new rasp bar to the support. Rasp bars are replaced in order to improve threshing efficiency and to avoid a rasp bar failure, which may significantly damage the combine.

The inventors have identified several problems with prior rasp bar designs. First, rough bolting surfaces on the rasp bars may cause an inconsistent translation of applied torque into effective clamp loading of the rasp bar to the rasp bar support that may lead to a rasp bar failure, which may significantly damage the rotor and rotor cage.

Second, rasp bar wear and retention during operation has become an issue due to increased rotor capacity and/or material flow. In particular, when impacted by harvested material such as corn, or by foreign material such as soil and/or rocks, the rasp bar may rotate about the rasp bar support bracket causing lost bolt tension and clamp load, leading to rasp bar retention failure.

Accordingly, there is a need for a rasp bar assembly that at least partially addresses the problems identified above. More specifically, there is a need for a rasp bar assembly having a bolting surface that facilitates an accurate translation of torque value measurement to clamp load during rasp bar attachment. Furthermore, there is a need for a rasp bar assembly having improved attachment stability that restricts the rotation of the rasp bar about the rasp bar support bracket.

SUMMARY OF THE INVENTION

In accordance with one aspect of the present invention, a rasp bar is disclosed that includes a lead-in side comprising a lead-in side inside surface, an upstream side comprising a first inside surface, a downstream side comprising a second inside surface, a trailing side, an interior surface, and a plurality of rotation stops protruding from the interior surface. The plurality of rotation stops are configured to prevent the rasp bar from rotating upon a rasp bar support when assembled thereupon.

In accordance with another aspect of the present invention, a rasp bar is disclosed that includes a lead-in side comprising a lead-in side inside surface, an upstream side comprising a first inside surface, a downstream side comprising a second inside surface, a trailing side, an interior surface, and a plurality of rotation stops protruding from the interior surface. The plurality of rotation stops are configured to prevent the rasp bar from rotating upon a rasp bar support when assembled thereupon.

In accordance with still another aspect of the present invention, a rotary threshing system is disclosed a threshing rotor, and a plurality of rasp bar assemblies attached to the threshing rotor. Each rasp bar of the plurality of rasp bar assemblies includes a rasp bar, a rasp bar support, and a fastener joining the rasp bar to the rasp bar support. The rasp bar comprises a plurality of rotation stops that protrude from an inside surface of the rasp bar and contact the rasp bar support to prevent the rasp bar from rotating upon the rasp bar support.

An advantage of the present invention is that it provides for a rasp bar assembly design that has improved attachment stability to the rasp bar support, thereby protecting the rotor and rotor cage from damage.

Another advantage of the present invention is that it provides for a rasp bar assembly having a more accurate translation of applied toque into clamp load.

Another advantage of the present invention is that it provides for a rasp bar assembly having improved material metallurgy.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
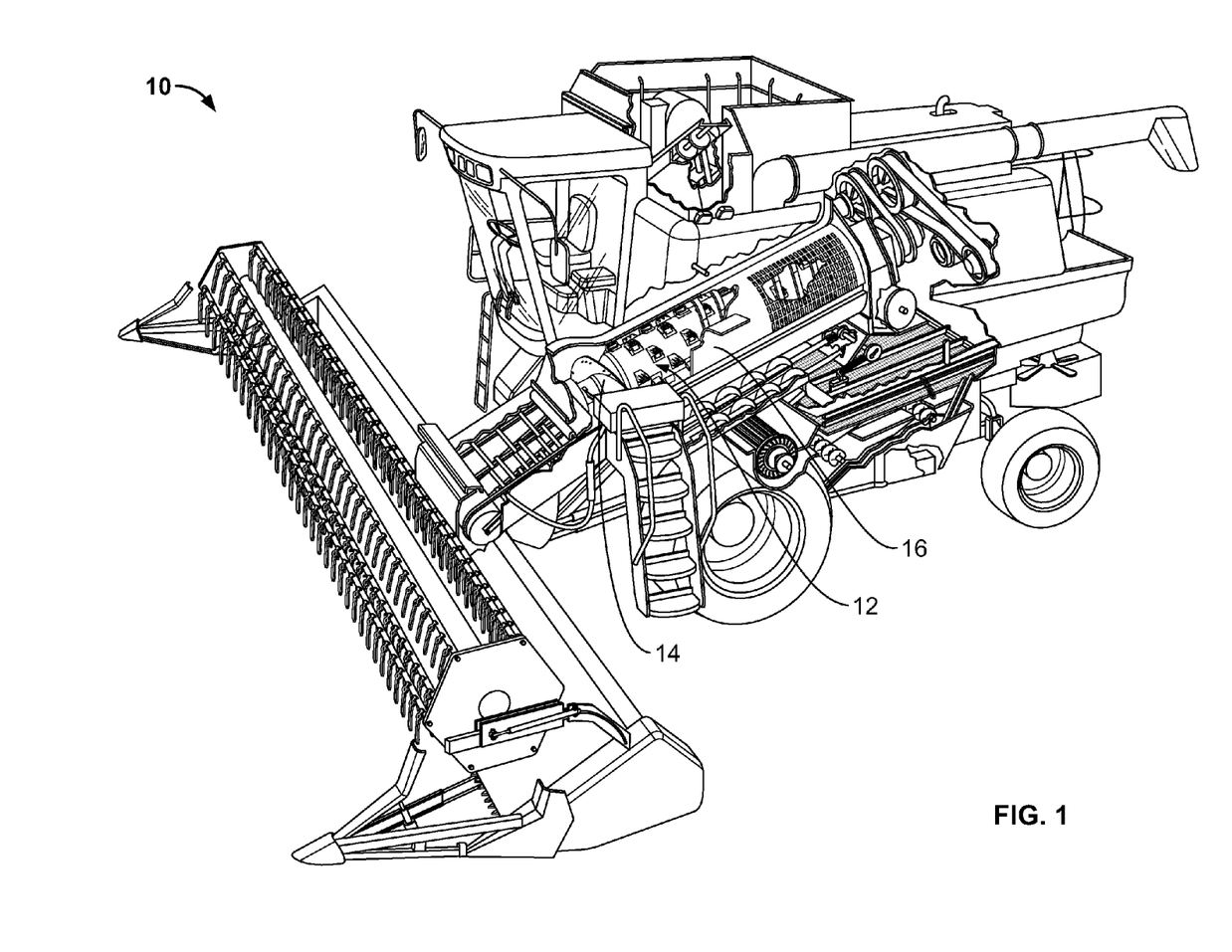
FIG. 1 shows an embodiment of an agricultural combine having a rotary threshing system according to the invention.

FIG. 1 depicts an embodiment of an agricultural combine 10 according to the invention. The agricultural combine 10 includes a rotary threshing system 12 having a threshing rotor 14 in a rotor cage 16. In another embodiment, the agricultural combine 10 may have two or more threshing rotors 14. Agricultural combine 10 is representative of an axial flow-type combine including one or two fore and aft extending threshing rotors, but it should be understood that it is contemplated that the invention can likewise be used with rotors of other types of combines, including, but not limited to, conventional types wherein one or more rotors of the invention will be mounted in a transverse orientation within a body of the combine.

Figure 2:
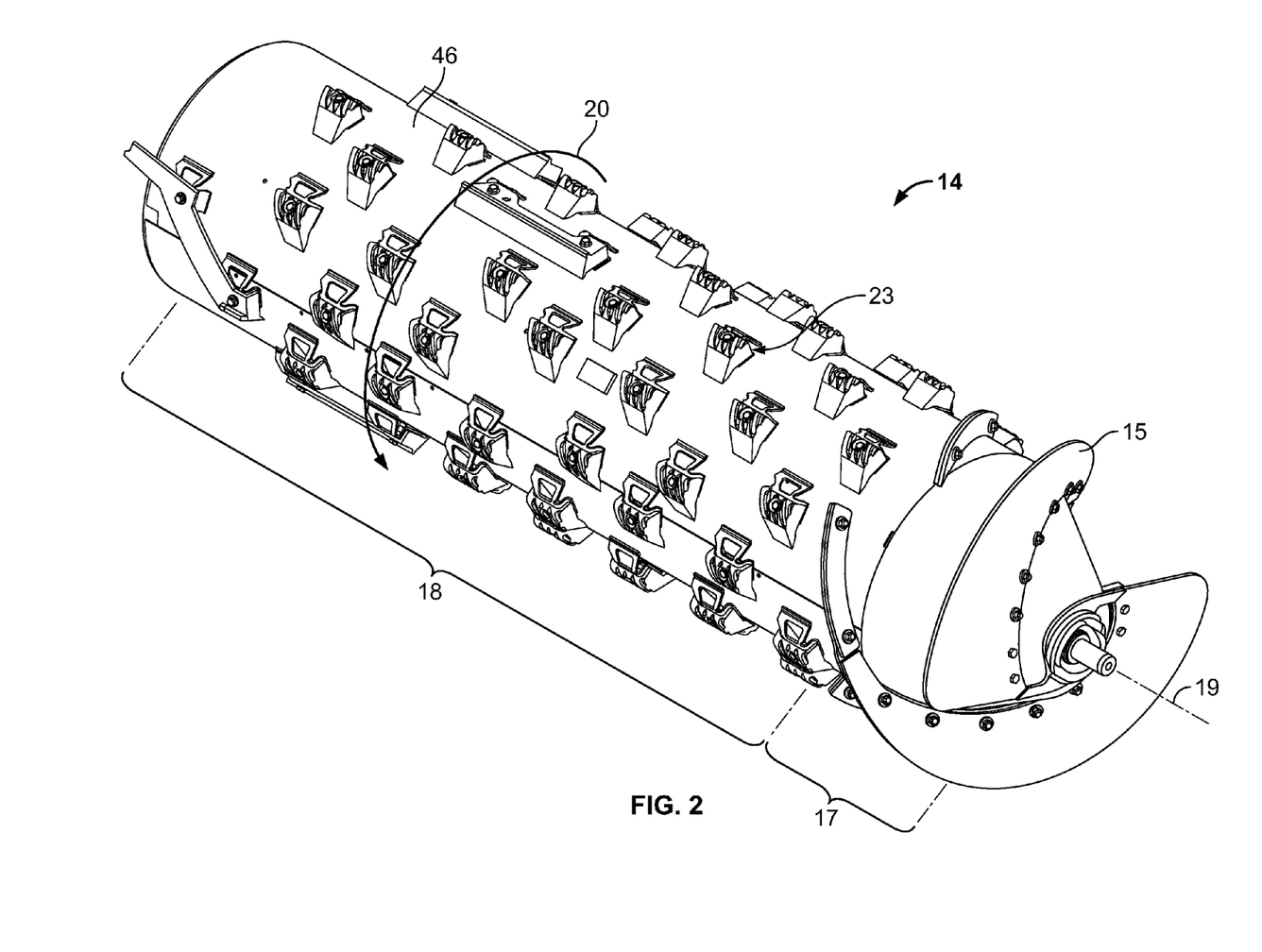
FIG. 2 shows an embodiment of a threshing rotor according to the present invention.
Figure 3:
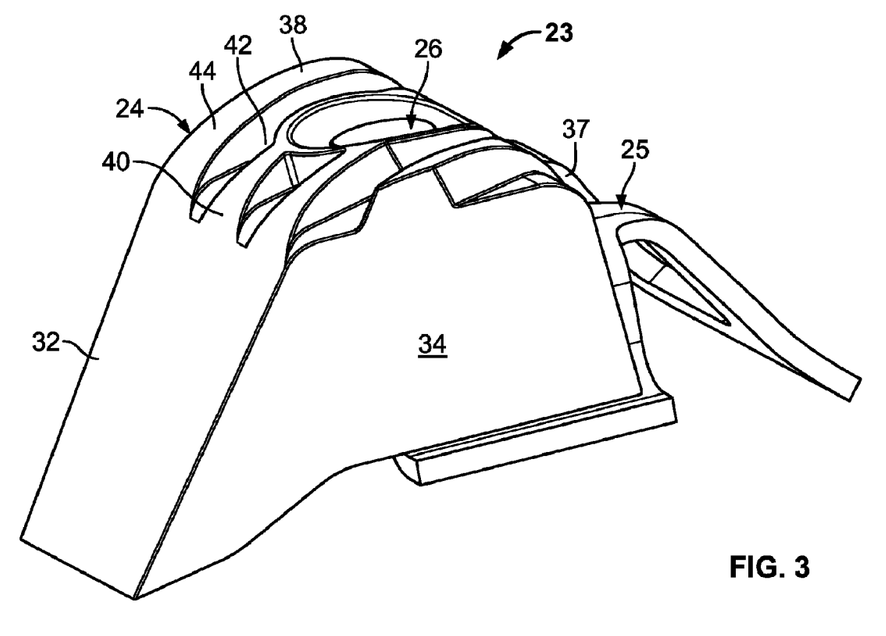
FIG. 3 is a front perspective view of an embodiment of a rasp bar assembly according to the present invention.
Figure 4:
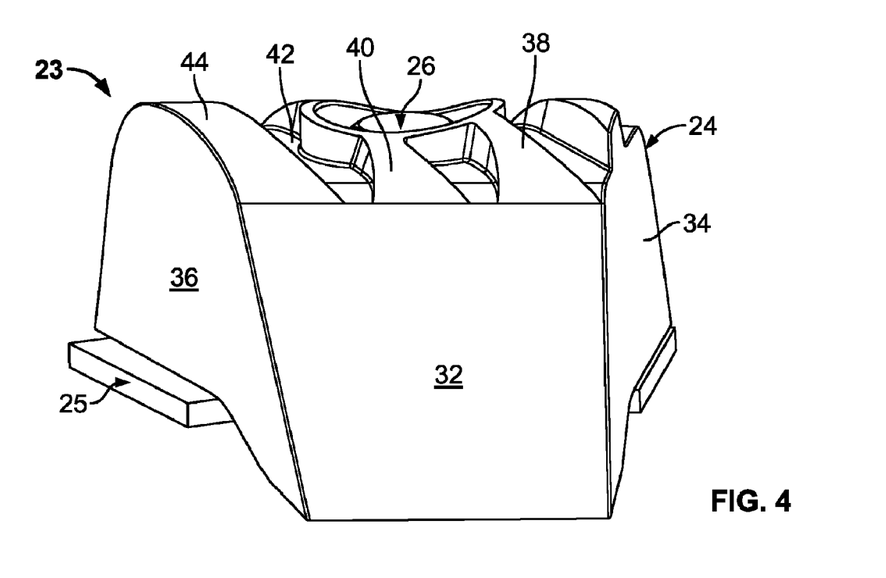
FIG. 4 is a front view of the rasp bar assembly of FIG. 3.
Figure 5:
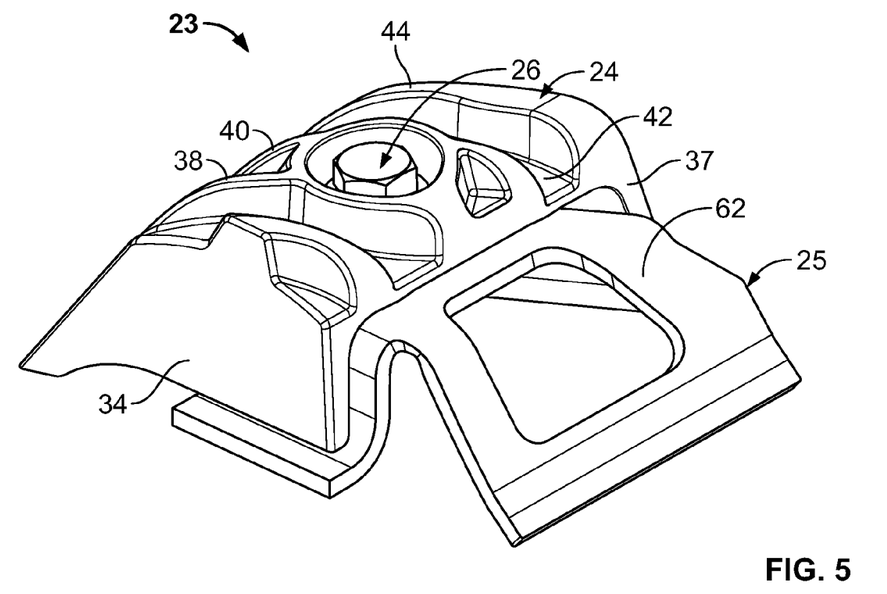
FIG. 5 is a rear perspective view of the rasp bar assembly of FIG. 3.
Figure 6:
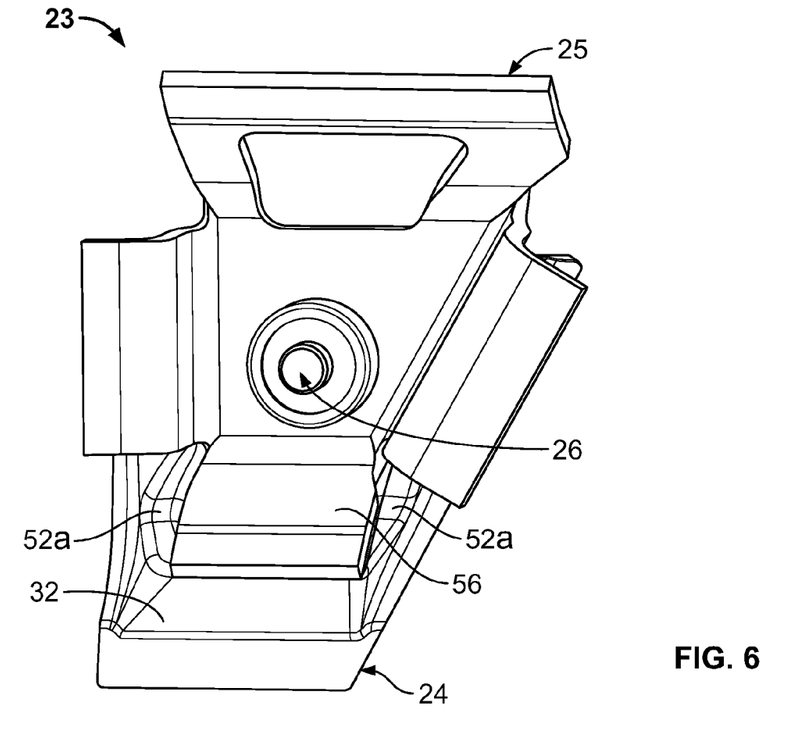
FIG. 6 is a bottom view of the rasp bar assembly of FIG. 3.

FIG. 2 shows a threshing rotor 14 according to an embodiment of the invention. As can be seen in FIG. 2, the threshing rotor 14 includes an auger flight 15 at an in-feed portion 17 to transfer crop material to a threshing portion 18. Threshing rotor 14 includes a plurality of rasp bar assemblies 23, which are mounted on the threshing rotor 14 to thresh crop material in a threshing manner well known in the art. In this embodiment, rasp bar assemblies 23 are mounted on threshing rotor 14 in a helical pattern, as shown in FIGS. 1 and 2. The threshing rotor 14 includes a longitudinal axis 19. When viewed from the longitudinal axis 19 at the in-feed portion, threshing rotor 14 rotates counter-clockwise during operation of rotary threshing system 12 as represented by arrow 20. In another embodiment, rasp bar assembly 23 may be mounted on the threshing rotor 14 in another pattern, such as, but not limited to a linear or staggered pattern.

FIGS. 3-8 show different views of an embodiment of a rasp bar assembly 23 according to the present invention. As can be seen in FIGS. 3-8, the rasp bar assembly 23 includes a rasp bar 24, a rasp bar support 25 and a fastener 26. The rasp bar assembly 23 is shown assembled in FIGS. 3-8. The rasp bar support 25 may be attached to the threshing rotor 14 as shown in FIGS. 1 and 2 by a metal joining technique, such as, but not limited to welding or brazing. The fastener 26 replaceably attaches the rasp bar 24 to the rasp bar support 25.

Figure 9:
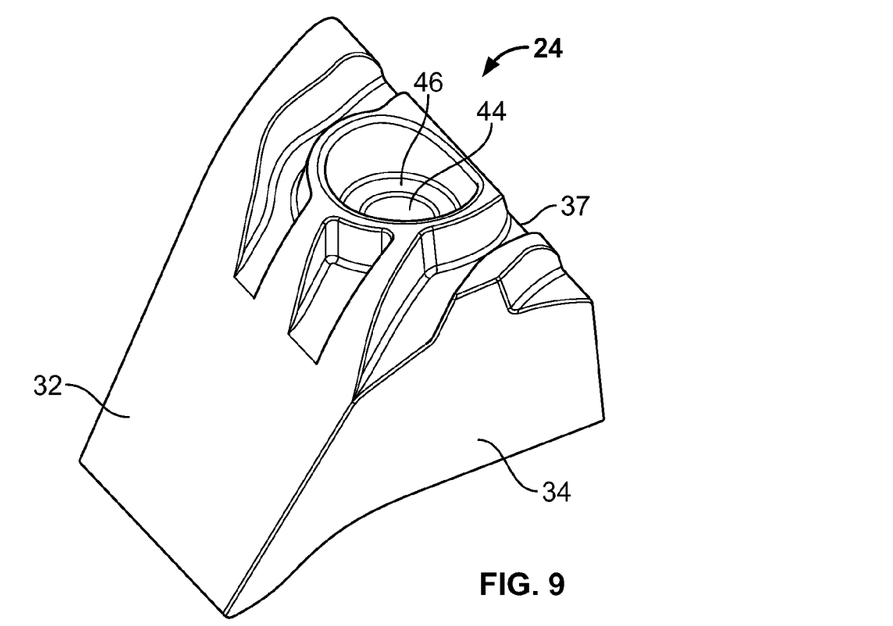
FIG. 9 is a front perspective view of an embodiment of a rasp bar according to the present invention.
Figure 10:
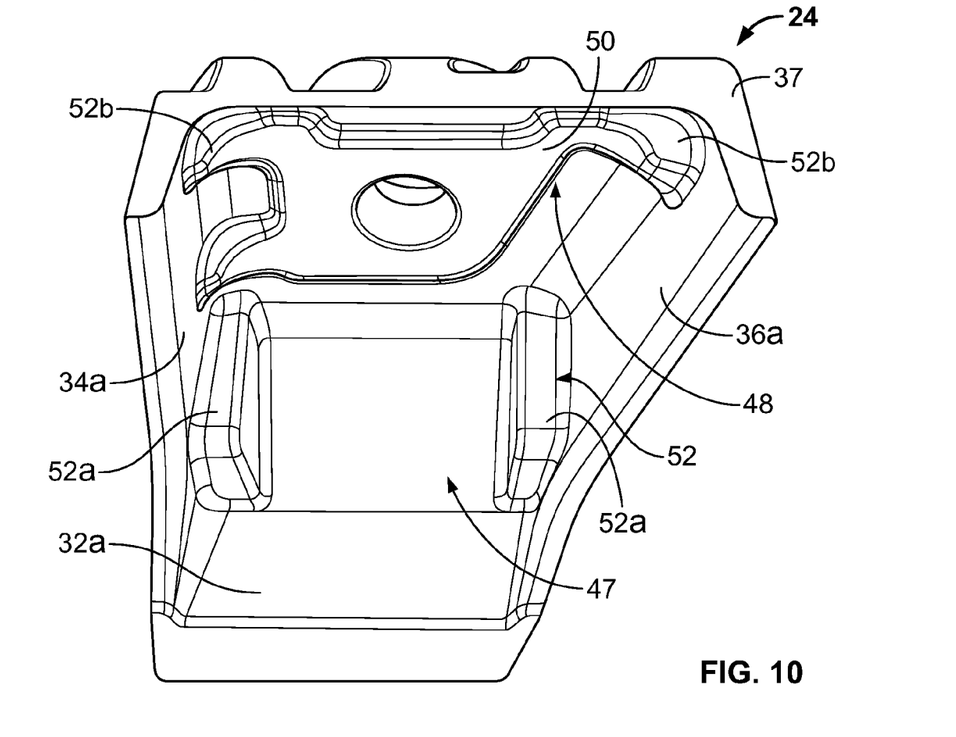
FIG. 10 is an underside perspective view of the rasp bar of FIG. 9.

FIGS. 9 and 10 show an embodiment of a rasp bar 24 according to the invention. The rasp bar 24 includes a lead-in side 32, an upstream side 34, a downstream side 36, and a trailing side 37. The lead-in surface 32 is smooth and configured to face in the direction of rotation of threshing rotor 14 when in the primary threshing mode. Upstream side 34 faces toward in-feed portion 17 (FIG. 2), and downstream side 36 faces away from in-feed portion 17.

Rasp bar 24 further includes a crop-engaging surface 38, which is configured to face outward, in a radial manner, from threshing rotor 14 (FIGS. 1 and 2). Generally, crop-engaging surface 38 includes a series of ribs 40 and an attendant series of valleys 42 interposed therebetween. Ribs 40 may be substantially parallel to one another. Crop-engaging surface 38 includes a protrusion 44 (commonly referred to as a "spike") proximate or adjoining downstream side 36 to increase threshing efficiency in some applications. Protrusion 44 is similar to a rib 40, but has a higher elevation and may have a different profile. In another embodiment, the rasp bar 24 may have other crop-engaging surface configurations.

The rasp bar may be formed of a hardened material. In an embodiment, the rasp bar 24 may be formed of an iron or steel. In an embodiment, the rasp bar 24 may be formed of a hardened iron or steel. In another embodiment, the rasp bar 24 may be formed of a austempered ductile iron (ADI). In another embodiment, the rasp bar 24 may be formed of a carbidic austempered ductile iron (CADI).

Figure 7:
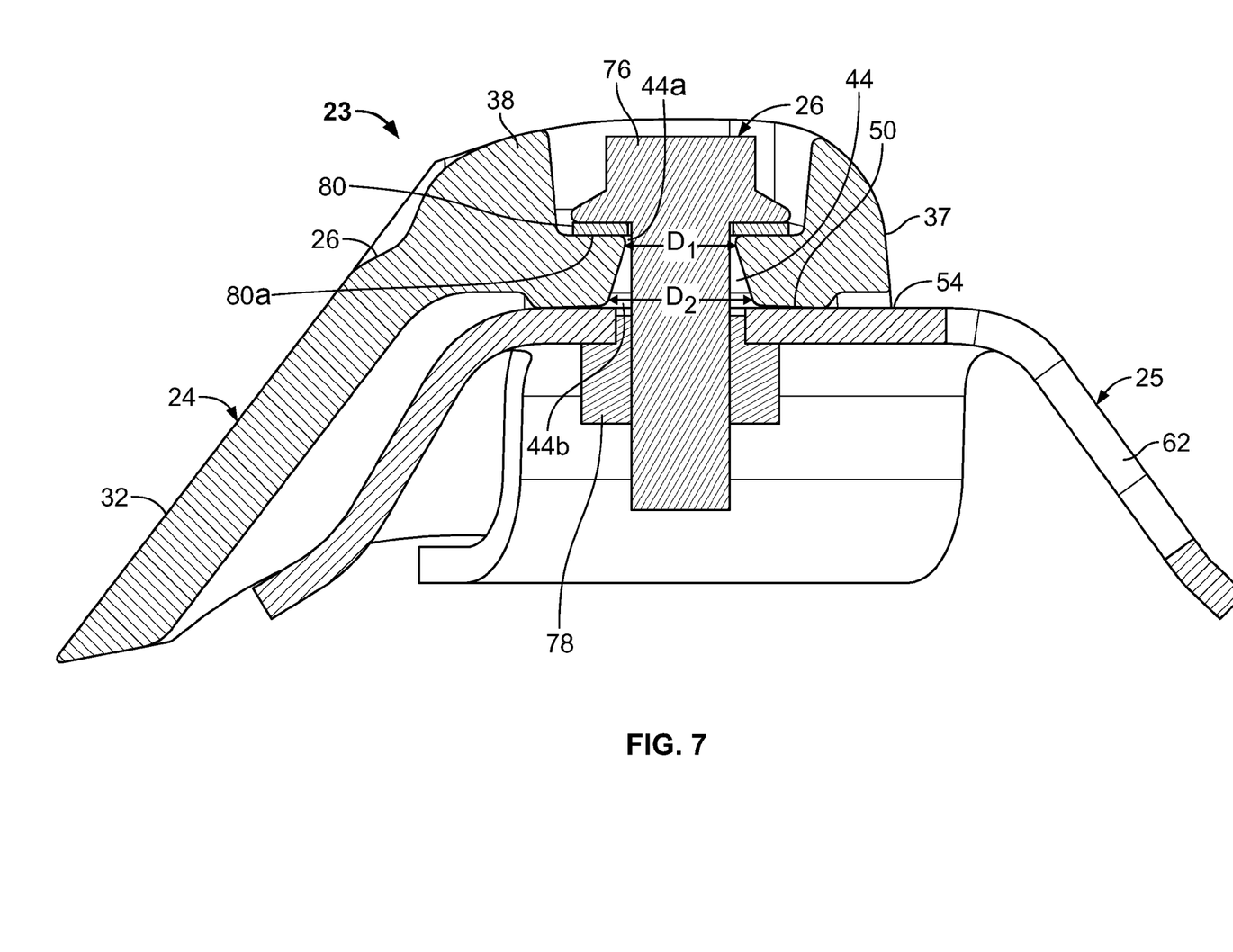
FIG. 7 is a side cut-away view of the rasp bar assembly of FIG. 3.

The rasp bar 24 further includes a through hole 44 that receives fastener 26. As seen in FIG. 7, the through hole 44 has a conical geometry including a first opening 44a having a first diameter $D_1$ and a second opening 44b having a second diameter $D_2$, with $D_1$ less than $D_2$. The through hole 44 has a substantially even decreasing taper between the first opening 44a and the second opening 44b. In another embodiment, the taper between the first opening 44a and the second opening 44b may be non-linear, for example, but not limited to a step-wise taper. In another embodiment, the through hole 44 may not be conical, but may have a constant cross section. The rasp bar 24 also includes a fastener support surface 46, upon which the fastener 26 is urged against to join the rasp bar 24 and the rasp bar support 25 as shown in FIGS. 3-8.

Referring to FIG. 10, the rasp bar 24 further includes an interior surface 47. The interior surface includes a lead-in side inside surface 32a, an upstream side inside surface 34a, a downstream side inside surface 36a and an inside top surface 48. The inside top surface 48 includes a mounting surface 50, which protrudes from the interior top surface. When the rasp bar 24 and the rasp bar support 25 are assembled as shown in FIGS. 3-8, the mounting surface 50 and the support bracket 25 are urged into contact by the fastener 26.

The rasp bar 24 further includes rotation stops 52. The rotation stops 52 may be referred to as protrusions. The rotation stops 52 protrude or extend from the interior surface 47. The rotation stops 52 include front rotation stops 52a and top rotation stops 52b. The rotation stops 52 support the rasp bar 24 in a fixed position on the rasp bar support 25 as shown in FIG. 3-8. The rotation stops 52 also prevent the rasp bar 24 from rotating about the rasp bar support 25 when assembled.

The front rotation stops 52a extend from the lead-in side inside surface 32a and the inside top surface 48. In another embodiment, the front rotation stops 52a may extend from any one of or combination of inside surfaces. In yet another embodiment, the front rotation stops 52a may extend from the lead-in side inside surface 32a. In another embodiment, the front rotation stops 52a may be omitted.

The top rotation stops 52b extend from the inside top surface 48 and the inside side surfaces 34a, 36a. In another embodiment, the top rotation stops 52b extend from either or both the inside top surface 48 and/or the inside sides 34a, 36a. In this exemplary embodiment, the rasp bar support 25 includes three top rotation stops 52b. In another embodiment, the rasp bar support 25 may include one or more top rotation stops 52b. In another embodiment, the rear rotation stops 52b may be omitted.

Figure 11:
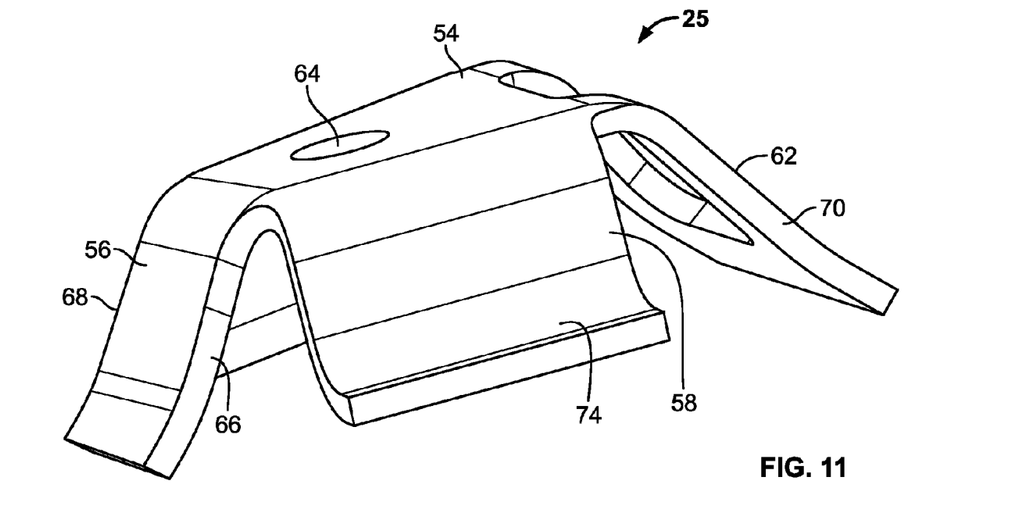
FIG. 11 is a side perspective view of an embodiment of a rasp bar support according to the present invention.
Figure 12:
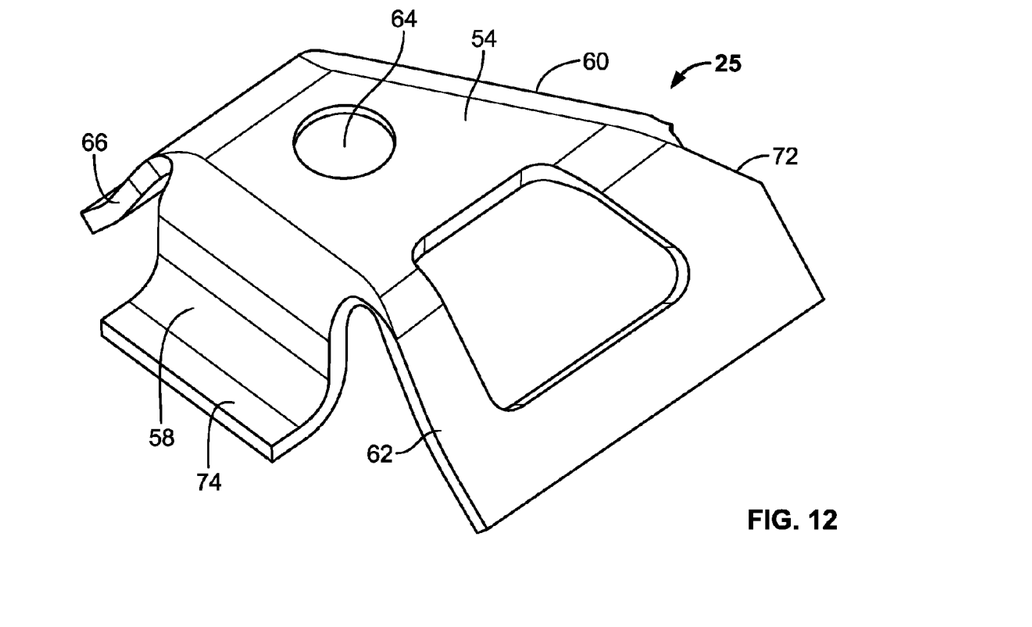
FIG. 12 is a rear perspective view of the rasp bar support of FIG. 11.

FIGS. 11 and 12 show an embodiment of a rasp bar support 25 according to an embodiment of the invention. As can be seen in FIGS. 11 and 12, the rasp bar support 25 includes a support surface 54, a lead-in side 56, an upstream side 58, a downstream side 60, and a trailing side 62. The trailing side 62 includes an upstream edge 70 and a downstream edge 72.

Figure 8:
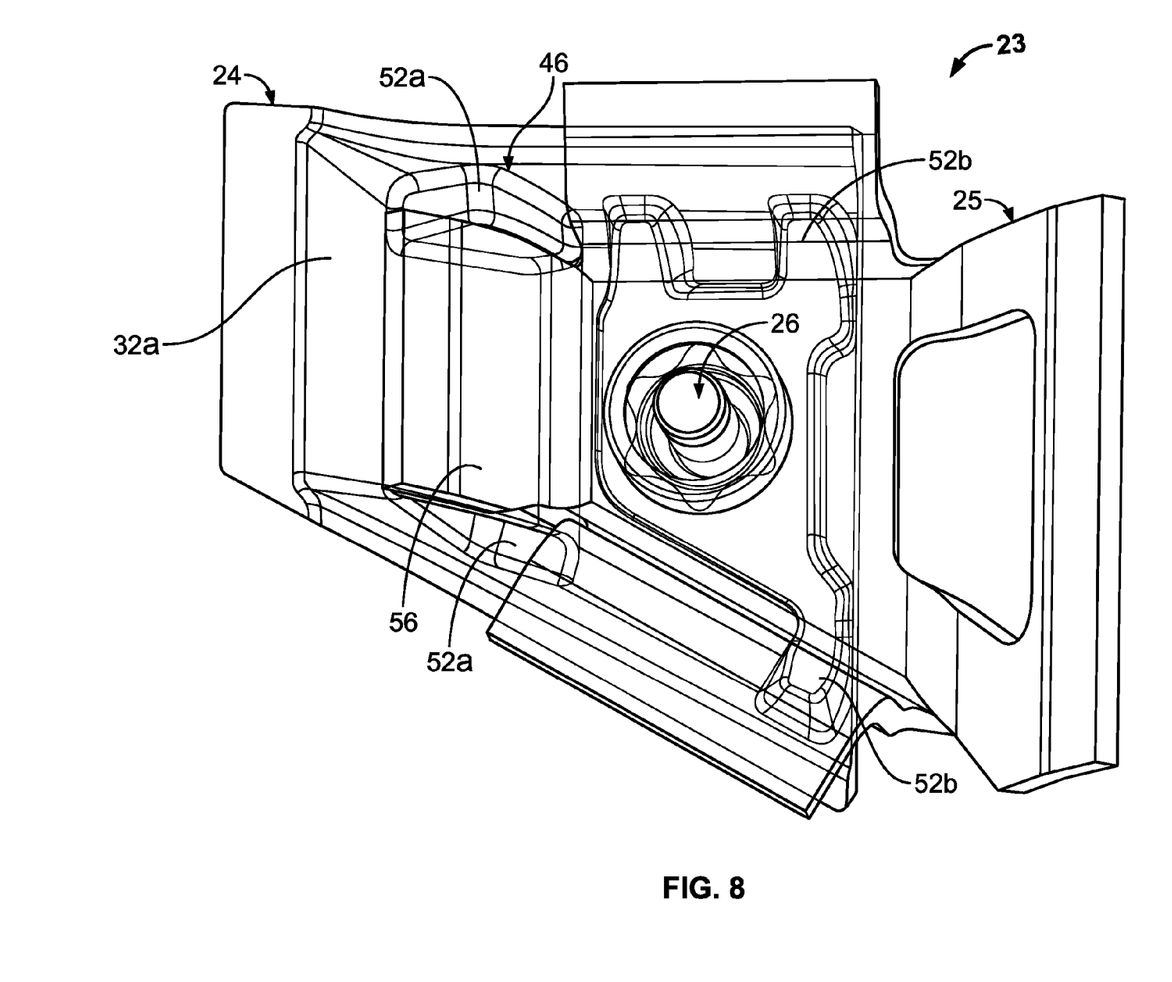
FIG. 8 is a bottom view of the rasp bar assembly of FIG. 3 having the rasp bar support shown in a ghost view.

The support surface 54 contacts the mounting surface 47 of the rasp bar 24 when the rasp bar 24 and the rasp bar support 25 are assembled as shown in FIG. 3-8. The support surface 54 includes a through hole 64, which corresponds to through hole 44 of rasp bar 24, for receiving fastener 27 (FIGS. 3-8). The support surface 54 contacts the top rotation stops 52b as shown in FIG. 8 to stabilize and rigidly connect the rasp bar 24 to the rasp bar support 25 when assembled as shown in FIGS. 3-8.

The lead-in side 56 includes an upstream edge 66 and downstream edge 68. The upstream and downstream edges 66, 68 contact the front rotation stops 52a (FIGS. 6 and 8) to stabilize and rigidly connect the rasp bar 24 to the rasp bar support 25 and to prevent the rasp bar 24 from rotating about the rasp bar support 25 when the rasp bar 24 and rasp bar support 25 are assembled as shown in FIGS. 3-8.

Upstream side 58 faces toward in-feed portion 20 (see FIG. 2), whereas downstream side 60 faces away from in-feed portion 20. The upstream side 50 and the downstream side 54 are not parallel to one another.

The upstream and downstream sides 58, 60 include support feet 74. The support feet 74 are disposed underneath corresponding upstream and downstream sides 34, 36 of the rasp bar 24 when the rasp bar 24 and rasp bar support 25 are assembled as shown in FIGS. 3-8.

Referring to FIG. 7, the fastener 26 includes a bolt 76, a nut 78, and a washer 80. In this embodiment, the nut 78 is swedged into the through hole 64 of the rasp bar support 25. In an embodiment, the fastener 26 may be a Strux™ fastener, which generally is a bolt and a nut configured to be swedged into an opening. In another embodiment, the nut 78 may be joined to the rasp bar support 25 by a metal joining technique, such as, but not limited to welding or brazing. In yet another embodiment, the nut 78 may be a threaded block of material that is joined to the rasp bar support 25. In another embodiment, the washer 80 may be omitted.

The washer 80 provides a smooth surface 80a for the bolt 76 to seat upon, improving the consistency of translation of applied torque to clamp load while tightening the fastener 26 to join the rasp bar to the rasp bar support. The washer 80 seats upon support surface 46, upon which the washer 80 is urged against to join the rasp bar 24 and the rasp bar support 25 when the rasp bar assembly is assembled as shown in FIG. 7.

To assemble the rasp bar assembly 23, the nut 78 is swedged into the through hole 64 of the rasp bar support. The rasp bar 23 is disposed upon the rasp bar support 25. The washer 80 is then placed on the support surface 46 of the rasp bar 24, and the bolt 76 is received in the nut 78 and tightened to torque specifications. The washer 80 burnishes the support surface 46 as the bolt 76 is tightened.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A rasp bar comprising:
   an interior surface, the interior surface includes an upstream side inside surface, a downstream side inside surface and an inside top surface; and
   at least one top rotation stop that protrudes from the interior surface of the rasp bar and is configured to prevent the rasp bar from rotating upon a rasp bar support when assembled thereupon, wherein the to rotation stop extends along both the inside top surface and at least one of the upstream and downstream side inside surfaces.

2. The rasp bar of claim 1, wherein the top rotation stop contacts a leading side of a rasp bar support.

3. A rasp bar, comprising:
   an interior surface, the interior surface includes a lead-in side inside surface, an upstream side inside surface, and a downstream side inside surface;
   at least one front rotation stop protruding from the interior surface; the front rotation stop is configured to prevent the rasp bar from rotating upon a rasp bar support when assembled thereupon, wherein the front rotation stop extends along both the lead-in side inside surface and at least one of the upstream and downstream side inside surfaces.

4. The rasp bar assembly of claim 3, wherein the front rotation stop contacts a leading side of the rasp bar support.

5. A rotary threshing system, comprising:
   a threshing rotor; and
   a plurality of rasp bar assemblies attached to the threshing rotor;
   wherein the rasp bar assemblies, comprise:
   a rasp bar having an interior surface, the interior surface includes an upstream side inside surface a downstream side inside surface an inside too surface and a lead-in side inside surface;
   a rasp bar support; and
   a fastener joining the rasp bar to the rasp bar support;
   wherein the rasp bar has at least one rotation stop that protrudes from the interior surface of the rasp bar and contact the rasp bar support to prevent the rasp bar from rotating upon the rasp bar support, wherein the rotation stop extends along the inside top surface, the lead-in side inside surface and at least one of the upstream and downstream side inside surfaces.

6. The rasp bar assembly of claim 5, wherein the rotation stop contacts a leading side of the rasp bar support.

7. The rasp bar assembly of claim 5, wherein the fastener comprises a bolt and a nut capable of being swedged into the rasp bar support.

8. The rasp bar assembly of claim 7, wherein the fastener further comprises a washer.

* * * * *